United States Patent [19]

Salacuse

[11] Patent Number: 4,667,826
[45] Date of Patent: * May 26, 1987

[54] CLAMPING DEVICE AND DISPLAY SYSTEM

[76] Inventor: Frank Salacuse, 710 Park Ave., New York, N.Y. 10021

[*] Notice: The portion of the term of this patent subsequent to Jul. 30, 2002 has been disclaimed.

[21] Appl. No.: 743,898

[22] Filed: May 10, 1985

Related U.S. Application Data

[63] Continuation of Ser. No. 508,968, Jun. 29, 1983, Pat. No. 4,531,636.

[51] Int. Cl.$^4$ .............................................. B65D 73/00
[52] U.S. Cl. .................. 206/461; 206/44 R; 206/362.2; 211/89
[58] Field of Search .......... 40/23 R; 206/44 R, 44.11, 206/45.31, 338, 341, 348, 361, 362.2, 461–471, 477, 478, 480, 483, 486, 488, 489, 490; 211/89; 248/316.1–316.8

[56] References Cited

U.S. PATENT DOCUMENTS

| | | | |
|---|---|---|---|
| 1,697,878 | 1/1929 | Mills | 206/486 |
| 2,465,859 | 3/1949 | Fidler | 211/89 |
| 2,529,372 | 11/1950 | Burns | 211/89 |
| 2,725,147 | 11/1955 | Vogler | 211/89 |
| 2,884,127 | 4/1959 | Neary | 206/462 |
| 3,338,390 | 8/1967 | Gordon | 206/306 |
| 3,341,006 | 9/1967 | Bindler | 206/461 |
| 3,575,290 | 4/1971 | Stork | 206/461 |
| 3,703,234 | 11/1972 | Howard | 206/349 |
| 4,079,839 | 3/1978 | Winfree, Jr. | 211/89 |
| 4,179,029 | 12/1979 | Fethke et al. | 206/349 |
| 4,240,604 | 12/1980 | Brach | 248/316.7 |
| 4,398,692 | 8/1983 | Macfie | 211/89 |

FOREIGN PATENT DOCUMENTS 0021844 of 1894 United Kingdom ................... 211/89

Primary Examiner—William Price
Assistant Examiner—Jimmy G. Foster
Attorney, Agent, or Firm—Paul J. Sutton

[57] ABSTRACT

The holding device of the present invention is an all plastic clamp for holding articles such as toothbrushes, pencils and similar shaped items. The clamp is also usable for holding textile materials such as curtains and towels. The plastic construction of the clamp allows its use in humid and wet areas where a clamp of metal construction will rust. The clamp of this invention also uses plastic hinges made from the same material as the body of the clamp thereby allowing the entire clamp to be extended. Additionally the clamp of this invention is provided with resilient plastic fingers which fill the interior of the holding portions of the clamp and allow the clamp to adjust to articles or varying sizes. The frame of the clamp is also provided with an external loop having the resilient plastic fingers and forming an auxilliary clamping feature.

1 Claim, 11 Drawing Figures

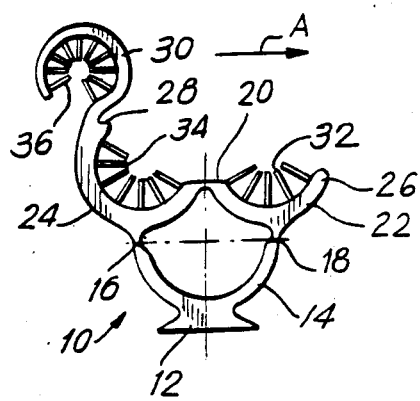
FIG. 1
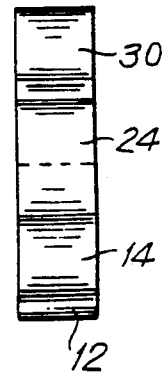
FIG. 2
FIG. 4
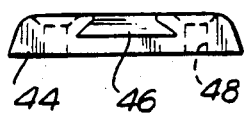
FIG. 3
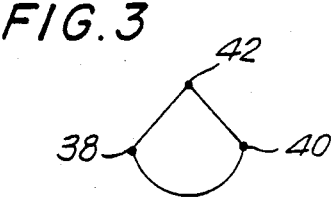
FIG. 5
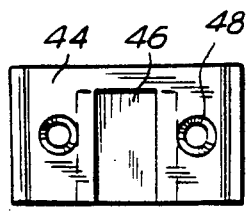
FIG. 6
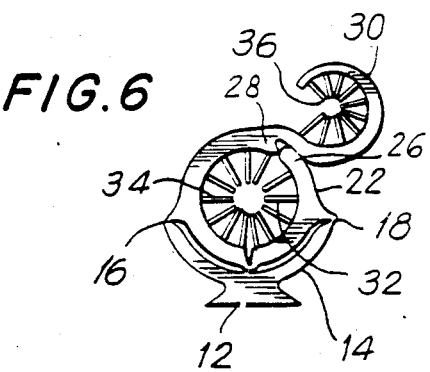
FIG. 7
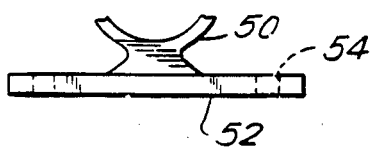
FIG. 8
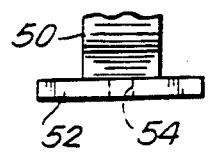

U.S. Patent  May 26, 1987  Sheet 2 of 2  4,667,826
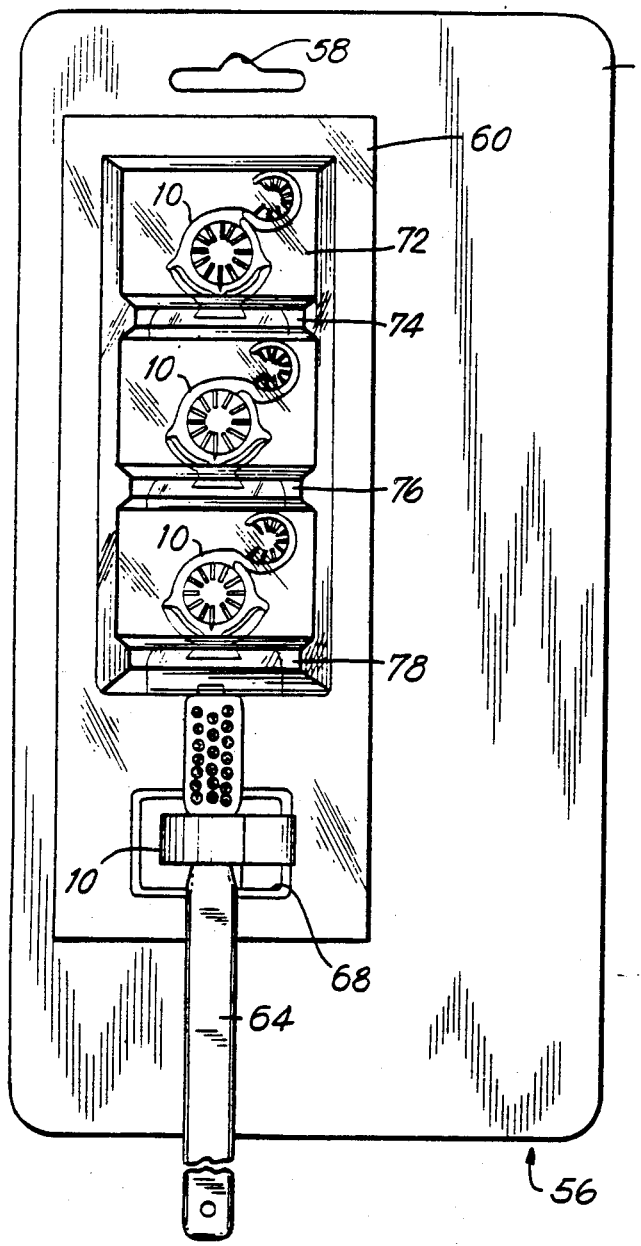
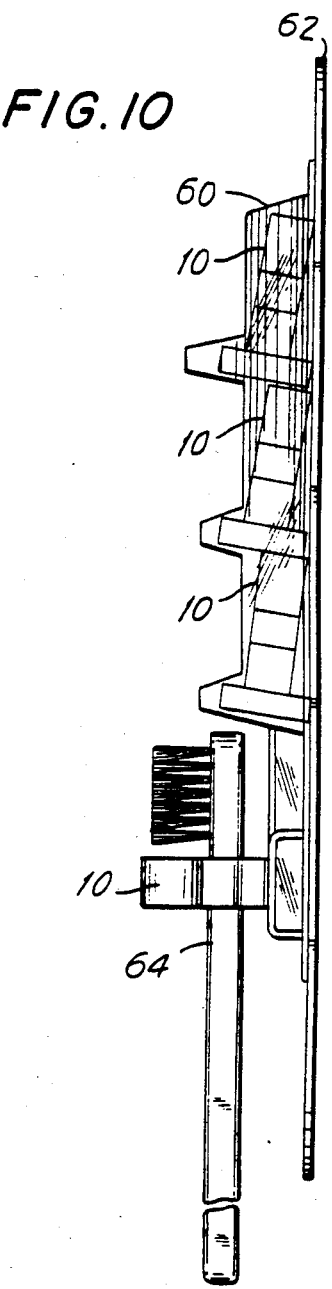
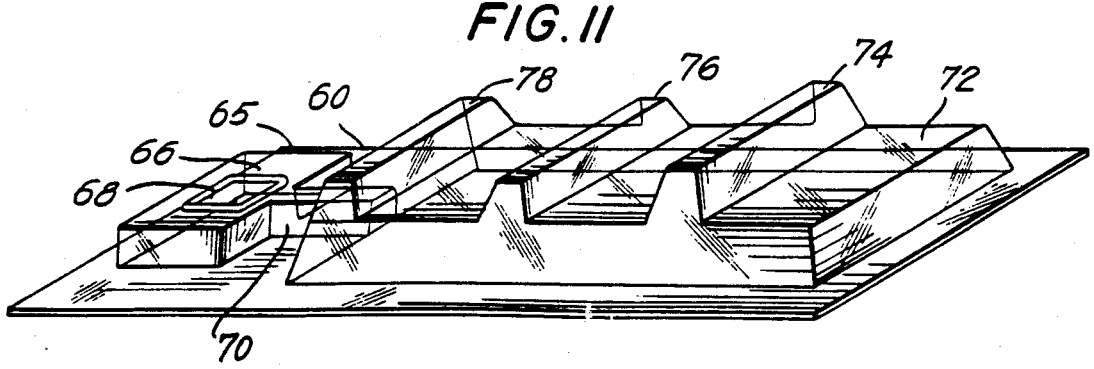

CLAMPING DEVICE AND DISPLAY SYSTEM

This is a continuation of application Ser. No. 508,968 filed June 29, 1983, now U.S. Pat. No. 4,531,636.

BACKGROUND OF INVENTION

The present invention relates to holding devices in general and to plastic holding devices capable of adapting to a variety of items to be held.

Holding devices which accomodate themselves to a variety of items are generaly constructed so as to provide a pair of jaws which are urged together by a restoring force such as a spring. An example of a spring restoring holding device is the spring operated closepin which can be described as a pair of jaws having a spring providing the restoring force. Spring clamps used in the business office for holding together papers is another illustration of a clamp having jaws which are urged together by a spring restoring force.

It is therefore an object of the present invention to provide for a clamping device which will accomodate a variety of items of differing size.

Another object of the invention is to provide for a clamping device which will withstand wet and humid conditions.

Yet another object of this present invention is to provide to a clamping device that can be made in its entirety from plastic.

Still another object of this invention is to provide for a clamping device which can be extended from a machine.

A further object of this invention is to provide for a clamping device having hinge portions which are integral with the body of the clamping device.

A still further object of this invention is to provide a clamping device with an auxiliary means of holding various objects.

Other and further objects of the invention will be apparent from the following drawings and description of a preferred embodiment of the invention in which like reference numerals are used to designate like parts in the various views.

DESCRIPTION OF THE DRAWINGS

FIG. 1 is a front elevational view of the clamping device of the present invention in the open position;

FIG. 2 is a side elevational view of the device of FIG. 1;

FIG. 3 is a functional diagram of the present invention;

FIG. 4 is a side view of a base for the present invention;

FIG. 5 is a top view of a base for the present invention;

FIG. 6 is a front elevational view of the device of FIG. 1 in the closed position;

FIG. 7 is a front partial view of an alternate base for the present invention;

FIG. 8 is a side partial view of FIG. 7;

FIG. 9 is a plan view of the display system for the closed position;

FIG. 10 is a side view of the display system shown in FIG. 9;

FIG. 11 is a perspective view of the molded cover shown in FIG. 9.

DESCRIPTION OF THE PREFERRED EMBODIMENT

Shown in FIG. 1 is a snapaction clamping device 10 of the present invention. The clamping device 10 is formed of one continuous plastic piece and is extended. The plastic of preference is polypropylene although other plastic materials may be used. The clamping device 10 is comprised of three main portions. The first main portion is a semicircular support 14 the remaining main portions are a first arcuate portion 22 and a second arcuate portion 24. At the midpoint of the semicircular support 14 a base 12 is affixed. At one end of the semicircular support 14 there is formed a first film hinge 16. A second film hinge 18 is found at the other end of the semicircular support 14. The midpoint of the first arcuate portion 22 is attached to the second film hinge 18 and contains a first finger set 32 and the midpoint of a second arcuate portion 24 is attached to the first film hinge 16 and contains a second finger set 34. Adjacent ends of the first arcuate portion 22 and the second arcuate portion 24 are seen to be connected by a third film hinge 20. Integral with the second arcuate portion 24 is a receiving cavity 28 and extending from the arcuate portion 24 is a circular extension 30 which does not form a closed circle. On the inside of the circular extension 30 is found a third finger set 36. The finger set 36 is shown to be web like in character being attached to the inside of the circular extension 30 and molded so as to extend radially inward as shown, each one of the third finger set 36 extends for the full width of the clamping device 10. The first arcuate portion 22 is provided with a first finger set 32 which is web-like in character similar to the finger set 36, and attached to the inside of the arcuate position 22. A second finger set 34 projects inwardly from the second arcuate portion 24. When the first and second arcuate portions 22 and 24 are closed they form the circular opening best seen in FIG. 6.

FIG. 2 shows a side view of the clamping snapaction device 10 where the circular extension 30 can be seen on the upper portion of the clamping device 10. Also shown is the second arcuate portion 24, the semicircular support 14 and the base 12.

FIG. 3 illustrates the relationship between a first hinge point 38, a second hinge point 40 and a third hinge point 42. The semicircular portion of FIG. 3 between the first hinge point 38 and the second hinge point 40 corresponds to the semicircular support 14. The portion of FIG. 3 between the first hinge point 38 and the hinge point 42 corresponds to the two hinges on the second arcuate portion 24. Similarly, the portion between the third hinge point 42 and the second hinge point 40 corresponds to the two hinges on the first arcuate portion 22.

FIG. 4 shows a foot plate, 44 which can be attached to the base 12 of the clamping device 10. The foot plates 44 is seen to have a tapered slot 46 and a pair of mounting holes 48.

FIG. 5 is the top view of the foot plate 44 showing other details of the tapered slot 46 and the pair of mounting holes 48.

FIG. 6 illustrates the clamping snapaction device 10 in a closed position. The elements of the clamping device 10 shown in this FIG. 6 is the same as that shown in FIG. 1. In this closed position the nesting of the end 26 in the receiving cavity 28 is shown as well as the structure formed by the first finger set 32 and the second finger set 34. It can be seen that all the fingers are radially extending inwardly from their respective arcuate portions.

FIG. 7 illustrates an integral base 52 which is made integral with an alternate semicircular support 14. Shown in the integral base 52 are a pair of attachment holes 54.

FIG. 8 shows the side view of the integral base 52 and also shows the alternate semicircular support 14 and the pair of attachment holes 54.

FIG. 9 depicts a display card 56 which is composed of a card 62 made of suitable material having attached to it a molded cover 60. The molded cover 60 has an upper portion wherein is stored three of the clamping devices 10 for display purposes. The lower portion of the molded cover 60 contains another one of the clamping devices 10 shown holding a toothbrush 64. The toothbrush 64 illustrates the use of the clamping device 10. A hanger hole 58 is shown at the top most position of the card 62. The hanger hole 58 is shown to the left of center of the card 62 since in this position the hole 58 is in line with the center of gravity of the card 62 thereby allowing the card to hang straight rather than at a tilt.

FIG. 10 shows the side view of the card 62. Shown is the molded cover 60 and four of the clamping devices 10. The lowest clamping device 10 is seen to be holding the tooth brush 64.

In FIG. 11 there is shown the molded cover 60 having a flange 65 around the periphery thereof. The top portion of the molded cover 60 is shown to have a display cavity 72 with a first raised portion 74, a second raised portion 76 and a third raised portion 78 placed as shown. At the bottom of the molded cover 60 is shown a fourth raised portion 66 having an opening 68. Connecting the fourth raised portion 66 and the display cavity 72 is a stiffener channel 70 which serves to lend support to the molded cover 60.

Operation of the snapaction clamping device 10 is as follows. FIG. 1 shows the clamping device 10 in an opened position. Assuming, as is the case during use, that the base 12 is anchored to a wall, the clamping device 10 is closed by grasping the circular extension 30 and moving it to the right most portion (arrow A) of the FIG. 1. This will result in the clamping device 10 closing as is shown in FIG. 6. With reference to FIG. 1 and FIG. 3, it can be seen that the inherent snap or spring action of the semicircular support 14 maintains the clamp 10 in an opened position. It can be seen that the portion of the clamp 10 between the first film hinge 16 and the third film hinge 20 is rigid, as is the portion of the clamp 10 between the second film hinge 18 and the third film hinge 20. Therefore as the third hinge point 42 is moved toward the semicircular support 14 during closure of the clamping device 10 the semicircular support 14 is caused to be stressed into snap or spring action. When the third hinge point passes the level of the first and second film hinges 16 and 18 the snap or spring action of the semicircular support 14 causes the first arcuate portion 22 and the second arcuate portion 24 to form a circular closure as is shown in FIG. 6. The receiving cavity 28 accepts the end 26 thereby locking the clamping device 10.

The central opening of the clamping device 10 is provided with web-like fingers extending radially inward from the arcuate portions. These web-like fingers are springy and when displaced by an object such as the toothbrush 64 will press against the object. Therefore an object to be held by the clamping device 10 does not have to completely occupy the central opening of the clamping device 10. Similarly, the circular extension 30 is provided with web-like fingers and perform in the same manner as the web-like fingers in the central opening. The operation of the clamping device 10 in part similar to the U.S. Pat. No. 4,240,604 to Ulrich. The aforedescribed clamping device is preferably extended and made of polyproplene.

A variety of bases may be used with the clamping device 10. Since the clamping device is molded with the base 12 the foot plate 44 is provided with the tapered slot 46 which will engage the base 12 and cause the clamping device 10 to lock onto the foot plate 44. The foot plate 44 is provided with the pair of mounting holes 48 for use in attaching the foot plate 44 by conventional means or attachment.

The integral base 52 is illustrated in FIGS. 7 and 8. Here the base 52 is molded with the clamping device 10 or cemented to the clamping device 10. The pair of attachment holes 54 permit the use of conventional fasteners. The foot plate 44 of FIGS. 4 and 5 and or the integral base 52 of FIGS. 7 and 8 may be provided with an adhesive coating on the side to be affixed to the means for supporting the clamping device 10.

In order for the consumer to appreciate the novelty of the present invention the display card 62 was developed. The display card 62 allows the storage of three clamping devices 10 in the display cavity 72 and the exposure of a clamping device 10 in the flat raised portion 66. The opening 68 permits the clamping device 10 to protrude from the molded cover 60 so that the prospective purchaser may familiarize himself with the clamping device 10 operation. For illustrative purposes the toothbrush 64 is provided to illustrate the action of the web like fingers.

The card 62 may be imprinted, front and back, with further illustrations of the clamping device 10 applications and instructions for use. The display cavity 72 is fabricated by vacuum molding an acetate sheet material. Other materials and fabrication techniques may be employed.

It is to be appreciated that modification and variations may be made to the herein disclosed embodiment of the invention without departing from the spirit and scope of the invention which is defined in the following claims.

What is claimed is:

1. A display system in combination with a plurality of snap-action clamping devices, comprising:
    a plurality of snap-action clamping devices;
    a supporting card having an aperture for mounting said card on a display rack;
    a molded cover having a plurality of compartments defined at least in part by said cover and said card, each compartment housing one of said snap-action clamping devices;
    a substantially flat raised portion having means defining an opening enabling one of said snap-action clamping devices to protrude from said portion and able to hold an object whereby a prospective purchaser is enabled to operate said snap-action clamping device thereby familiarizing himself with said snap-action clamping device before purchase, said snap-action clamping device including a plurality of substantially radially extending fingers for retaining a number of different objects of various sizes whereby said fingers are movable to accommodate such varying sizes upon insertion of such objects within said snap-action clamping device, said movable fingers being integral with a body of said snap-action clamping devices and being formed of a flexible plastic material.

* * * * *